US011835625B2

(12) United States Patent
Nespoli et al.

(10) Patent No.: US 11,835,625 B2
(45) Date of Patent: Dec. 5, 2023

(54) ACOUSTIC-ENVIRONMENT MISMATCH AND PROXIMITY DETECTION WITH A NOVEL SET OF ACOUSTIC RELATIVE FEATURES AND ADAPTIVE FILTERING

(71) Applicant: NUANCE COMMUNICATIONS, INC., Burlington, MA (US)

(72) Inventors: Francesco Nespoli, London (GB); Patrick Naylor, Reading (GB); Daniel Barreda, London (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 24 days.

(21) Appl. No.: 17/695,444

(22) Filed: Mar. 15, 2022

(65) Prior Publication Data
US 2023/0296767 A1    Sep. 21, 2023

(51) Int. Cl.
*G01S 5/10* (2006.01)
*G01S 7/527* (2006.01)
*G01S 15/10* (2006.01)

(52) U.S. Cl.
CPC .......... *G01S 15/101* (2013.01); *G01S 7/5273* (2013.01)

(58) Field of Classification Search
CPC .............. G01S 15/101; G01S 7/5273

USPC ........................................................... 367/99
See application file for complete search history.

(56) References Cited

PUBLICATIONS

Cohen et al.; "Acoustics Based Proximity Detector for Mobile Phones", Signal and Image Processing Laboratory (SIPL), 2020, 5 pages.

*Primary Examiner* — Daniel L Murphy
(74) *Attorney, Agent, or Firm* — Barta, Jones & Foley, PLLC

(57) ABSTRACT

A method of performing distance estimation between a first recording device at a first location and a second recording device at a second location includes: estimating acoustic relative transfer function (RTF) between the first recording device and the second recording device for a sound signal, e.g., by applying an improved proportionate normalized least mean square (IPNLMS) filter; and estimating the distance between the first recording device and the second recording device based on the RTF. The at least one acoustic feature extracted from the RTF estimated between the first recording device and the second recording device includes at least one of clarity index, direct-to-reverberant ratio (DRR), and reverberation time. A distributed-gradient-boosting algorithm with regression trees is used in combination with signal-to-reverberation ratio (SRR) and the at least one acoustic feature extracted from the RTF to estimate the distance between the first recording device and the second recording device.

20 Claims, 7 Drawing Sheets

Reference microphone (ref)

Sound source (S)

Distant microphone (r*)

dSr*: distance between source and distant microphone

|  | r_t60 | r_c50 | r_drr | r_srr | sparseness |
|---|---|---|---|---|---|
| r_t60 | 1.00 | -0.15 | -0.41 | 0.24 | -0.47 |
| r_c50 | -0.15 | 1.00 | 0.79 | -0.29 | 0.85 |
| r_drr | -0.41 | 0.79 | 1.00 | -0.34 | 0.89 |
| r_srr | 0.24 | -0.29 | -0.34 | 1.00 | -0.39 |
| sparseness | -0.47 | 0.85 | 0.89 | -0.39 | 1.00 |

FIG. 2

ACOUSTIC-ENVIRONMENT MISMATCH AND PROXIMITY DETECTION WITH A NOVEL SET OF ACOUSTIC RELATIVE FEATURES AND ADAPTIVE FILTERING

BACKGROUND OF THE DISCLOSURE

1. Field of the Disclosure

The present disclosure relates to systems and methods for sound signal processing, and relates more particularly to acoustic-environment mismatch and proximity detection.

2. Description of the Related Art

When a sound signal from an acoustic source is captured by one or more microphone(s), the sound signal often gets corrupted by the acoustic environment, i.e., background noise and convolutive effects of room reverberation. In the case of a room equipped with one fixed microphone (e.g., a microphone of a smart home assistant such as Alexa™-enabled Echo™ device, hereinafter referred to as "fixed smart speaker") and a freely-moving wearable smart device (e.g., watch, glasses or smartphone) coupled with an acoustic source, it is very useful to estimate the distance between the fixed smart speaker and the wearable smart device, e.g., for automatic speech recognition (ASR) and for determining whether the wearable device is in the same room with the fixed smart speaker.

The task of estimating the distance between the fixed smart speaker and the wearable smart device is a crucial component of achieving localization with wearable smart device and fixed smart speaker, which localization techniques commonly involve aggregating the distance and angle measurements to produce the putative location of the target device (e.g., the wearable smart device). In the present disclosure, the primary focus is estimating the distance in indoor environments, also referred as indoor-ranging. This problem has been tackled with many different technologies, e.g., Wi-Fi radio frequency, light beams, inertial sensors, and computer vision. However, all of the aforementioned methods have significant drawbacks. Radio frequency, inertial sensors and light beams require ad-hoc infrastructure and expensive sensors. Computer vision has several disadvantages, including: requirement for huge image data sets; being severely affected by indoor light conditions; potential privacy issues; and cannot be applied in the context of smart devices due to its high computational cost.

Because of the above-mentioned disadvantages, acoustic localization techniques have garnered attention, which techniques achieve relatively high accuracy and low time latency, while requiring only microphones and speakers usually embedded in current smart devices. A popular approach in the acoustic localization domain consists of measuring the time of flight (ToF), which is the time a signal takes to travel from transmitter to receiver. In this way, knowing the emission time of the transmitter, it is possible to estimate the inter-device distance. However, this technique does not produce accurate distance estimation results mainly due to poor estimation of ToF. Other conventional techniques require the knowledge of, or rely on blind estimation of, the acoustic environment, e.g., room impulse response (RIR).

Therefore, a need exists for providing an acoustic localization technique which produces more accurate distance estimations.

SUMMARY OF THE DISCLOSURE

In a typical smart home, a fixed smart speaker equipped with microphones can be used to control other devices in the house remotely (e.g., via acoustic commands from a user), and it is also common for people to wear one or more smart device equipped with a microphone (e.g., a smart watch or smart glasses). In this example scenario, an example embodiment of a novel fully acoustic ranging system is presented, which ranging system is based on a set of acoustic features extracted from the acoustic relative transfer function (RTF) estimated between the fixed smart speaker and the wearable device. The RTF represents a filter that maps the signal record from the fixed smart speaker to the signal recorded from the wearable device.

According to an example embodiment of the present disclosure, the set of acoustic features for the acoustic ranging system includes acoustic features commonly extracted from the room impulse response (RIR), e.g., the clarity index (C50) and the direct to reverberant ratio (DRR), which take into account both source-receiver distance and room acoustics, and the reverberation time (T60).

According to an example embodiment of a method according to the present disclosure, an optimized distributed-gradient-boosting algorithm with regression trees is used, in combination with the signal to reverberation ratio (SRR) and the sparseness coefficient of the RTF, to estimate the distance between the fixed smart speaker and a wearable device using only the RTF-extracted relative features (e.g., R-T60, R-C50 and R-DRR).

According to an example embodiment of a method according to the present disclosure, two types of sound signals were tested: i) broad band white shaped noise (as an example, the noise can be in the frequency band of 15-20 kHz, although other broad band frequency can be used); and ii) speech signals of different durations.

According to an example embodiment of a method according to the present disclosure, the method is applied for detecting the proximity of a user with respect to the fixed smart speaker.

According to an example embodiment of a method according to the present disclosure, the method is applied for detecting obstruction of the direct path between the wearable device and the fixed smart speaker, which information can be useful to properly tune a beamformer for a multichannel device.

According to an example embodiment of a method according to the present disclosure, the method is applied for scene analysis, i.e., assessing whether a wearable device is in the same room with respect to the fixed smart speaker.

According to an example embodiment of a method according to the present disclosure, the method is applied for room virtualization, e.g., coupling the method with ASR to acoustically reconstruct the physical environment.

BRIEF DESCRIPTION OF THE FIGURES

FIG. 2 shows a cross-correlation matrix of all the relative features and the distance in the case of white noise signal.

DETAILED DESCRIPTION

In an example embodiment of a method according to the present disclosure, the improved proportionate normalized least mean square (IPNLMS) technique (adaptive filter) is used for estimation, e.g., online estimation, of the acoustic relative transfer function (RTF) between two audio recording devices (e.g., the fixed smart speaker and a wearable device). In the present disclosure, the term "IPNLMS filter" represents an estimate of the RTF. "IPNLMS filter" can be implemented using software, which can be included in an embodiment of a software module for "IPNLMS filter". By analyzing the time-varying sparseness of the estimated filter, the example embodiment of the method enables assessment of the compatibility of the wearable device's acoustic environment and the fixed smart speaker's acoustic environment throughout the entire speech recording in an online fashion.

Figure 1A:
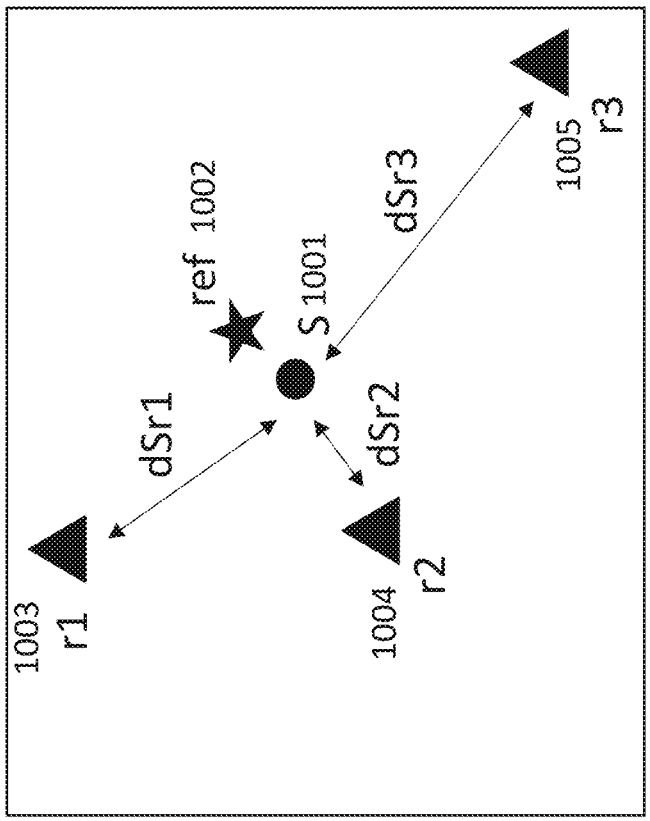
FIG. 1a illustrates an example positioning scenario involving multiple microphones for capturing a user's speech in a room embodiment.

FIG. 1a illustrates an example positioning scenario involving multiple microphones for capturing a user's speech in a room embodiment. As shown in FIG. 1a, the sound source (which can be, e.g., the human user or a speaker component of a fixed smart speaker) is represented as S 1001; the reference microphone (e.g., of the fixed smart speaker) is represented as ref 1002; and three distant microphone(s) (e.g., of wearable devices) are represented as r1 1003, r2 1004 and r3 1005. The respective distances between the sound source S 1001 and the distant microphones r1 1003, r2 1004 and r3 1005 are represented as dSr1, dSr2 and dSr3. In this example embodiment, the IPNLMS filter is used to perform an online estimation, i.e., every time a new audio sample from the two audio devices (i.e., the reference microphone 1002 and a distant microphone r1 1003, r2 1004 or r3 1005) is available, the RTF estimate gets updated based on the error signal which is computed using the previous recording samples and the newly available audio sample. The RTF represents a filter that maps, sample by sample, one signal (the one recorded from the reference microphone 1002, e.g., of the fixed smart speaker) to the other (the signal recorded from the wearable device, e.g., distant microphone r1 1003, r2 1004 or r3 1005). Essentially, the RTF estimates the reverberation components of the room which relate the signal of the fixed smart speaker to the wearable device.

In the present example embodiment, the RTF is a time domain RTF, and the signal model for the scenario illustrated in FIG. 1a can be represented as follows:

Signal model:

$$\text{ref}(t) = s(t) * \text{rir}_{ref}(t)$$

$$r_i(t) = s(t) * \text{rir}_i(t)$$

$$r_i(t) = \text{ref}(t) * \text{rtf}_{ref}^{ri}(t)$$

s(t): anechoic audio signal
$\text{rir}_{location}(t)$: room impulse response at the specified location
$r_{location}(t)$: recorded audio at the specified location
$\text{rtf}_{location\ 1}^{location\ 2}(t)$: relative transfer function from location 1 to location 2
IPNLMS estimates $\text{rtf}_{ref}^{ri}(t)$ in the above signal model.

Figure 1B:
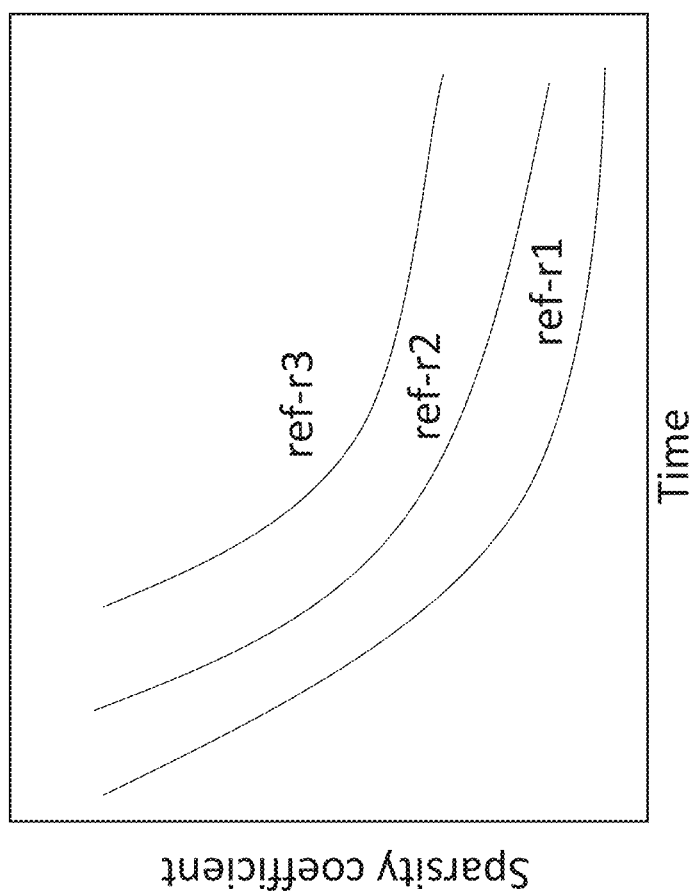
FIG. 1B shows a graph plotting sparsity coefficient vs. time for the RTF.

FIG. 1B shows a graph plotting sparsity coefficient vs. time for the RTF. The three curves, i.e., ref-r1, ref-r2 and ref-r3, refer to the sparseness of the RTF filter calculated between the reference microphone 1002 and the distant microphones r1 1003, r2 1004 and r3 1005, respectively. As shown in FIG. 1B and FIG. 2, the sparsity coefficient of the estimated RTF filter tightly correlates with source stationarity and positioning, making IPNLMS an effective, fully acoustic detector for sound source movement and proximity detection. In addition, by introducing in the model acoustic relative features estimated from the RTF, it is possible to reliably estimate the distance between the fixed smart speaker and the wearable device, as explained in detail below.

According to another example embodiment of the present disclosure, in order to investigate the performance of distance estimation with relative features, simulated data of reverberant rooms obtained with Pyroomacoustics™ (a software package aimed at the rapid development and testing of audio array processing algorithms) were utilized. For each simulated room, the wearable device was positioned in 1000 random positions, whereas the position of the smart speaker was fixed. For each position of the wearable device, i) the reverberated sound signal recorded by both the smart speaker and the wearable device was simulated, and ii) RTF estimation was performed using the IPNLMS adaptive filter, which is described in further detail below. In the simulations, two types of sound signals were tested: i) broadband white shaped noise was used, which should not annoy human listeners or interferer with speaker and microphone operations; and ii) speech signals of different durations randomly chosen from the publicly available Acoustic Characterization of Environments (ACE) data set.

In this section, the IPNLMS adaptive filter is briefly described, e.g., as an application for network echo cancellation. The mathematical notation used is the following:

$x(n)$: smart device near-field audio sample $y(n)$: smart speaker far-field audio sample $X(n) = [x(n), x(n+1), \ldots, x(n-L+1)]^T$ near-field audio $h = [h_o, \ldots, h_{L-1}]^T$ ground-truth RTF $\hat{h}(n) = [\hat{h}_o(n), \ldots, \hat{h}_{L-1}(n)]^T$ estimated RTF where L is the length of the estimated RTF and n is the timestamp. The role of IPNLMS is to produce the RTF estimation $\hat{h}(n)$ iteratively using, for each timestamp update, the error signal estimated as:

$$e(n) = y(n) - \hat{h}^T(n-1)X(n) \quad (1)$$

Finally, the updated filter for the current timestamp is given by:

$$\hat{h}(n) = \hat{h}(n-1) + \mu \frac{e(n)K(n-1)X(n)}{X(n)^T K(n-1)X(n) + \delta} \quad (2)$$

$$K(n-1) = ding(k_y(n-1), \ldots, k_{L-1}(n-1)) \quad (3)$$

$$k_l(n) = \frac{1-\alpha}{2L} + (1+\alpha)\frac{|\hat{h}(n)|}{2\|\hat{h}(n)\|_l + \epsilon} \quad (4)$$

where: $\mu$ is the adaptation step; $\delta$ is the regularization factor; $\alpha$ is a real number in the interval $[-1, +1]$; and $\epsilon$ is a small number useful to avoid zero division.

In this section, relative acoustic features extraction will be discussed. Conventionally, C50, T60 and DRR are estimated from RIRs, but in most smart home applications RIR measurements are not available, which necessitates blind estimation of the aforementioned acoustic features (C50, T60 and DRR) from reverberated speech signals. However, because C50 and DRR are directly related to source-receiver distance, blind acoustic feature estimation produces overly coarse estimates for accurate distance estimation. Therefore, in the example embodiments according to the present disclosure, the relative acoustic features are calculated from the estimated RTF which represents the mapping of the acoustic signals from the fixed smart speaker to the wearable device.

In this section, distance regression and prediction explainability will be discussed. In an example embodiment according to the present disclosure, distance estimation was carried out with the gradient boosting algorithm XGBoost with decision tree regressor as base model. This model (which can be implemented using software, hardware and/or connected online resources, e.g., servers, one or more of which can be included in an embodiment of the distance estimation module) was utilized i) because it has been demonstrated to perform better on tabular data inputs compared with neural networks, and ii) because of its explainability with respect to the input features. The distance estimation was shaped as a supervised task by providing, at training time, the ground truth values for fixed speaker-wearable device distance. The model was trained with the mean squared error (MSE) loss for a number of epochs established at run time, with the early stopping criterion of 15 epochs without improvements on the validation loss. Furthermore, SHapley Additive exPlanations (SHAP) values were employed to demonstrate the importance of the input features on the model prediction. Finally, the best hyper-parameters combination was chosen with a grid search approach.

Figure 1C:
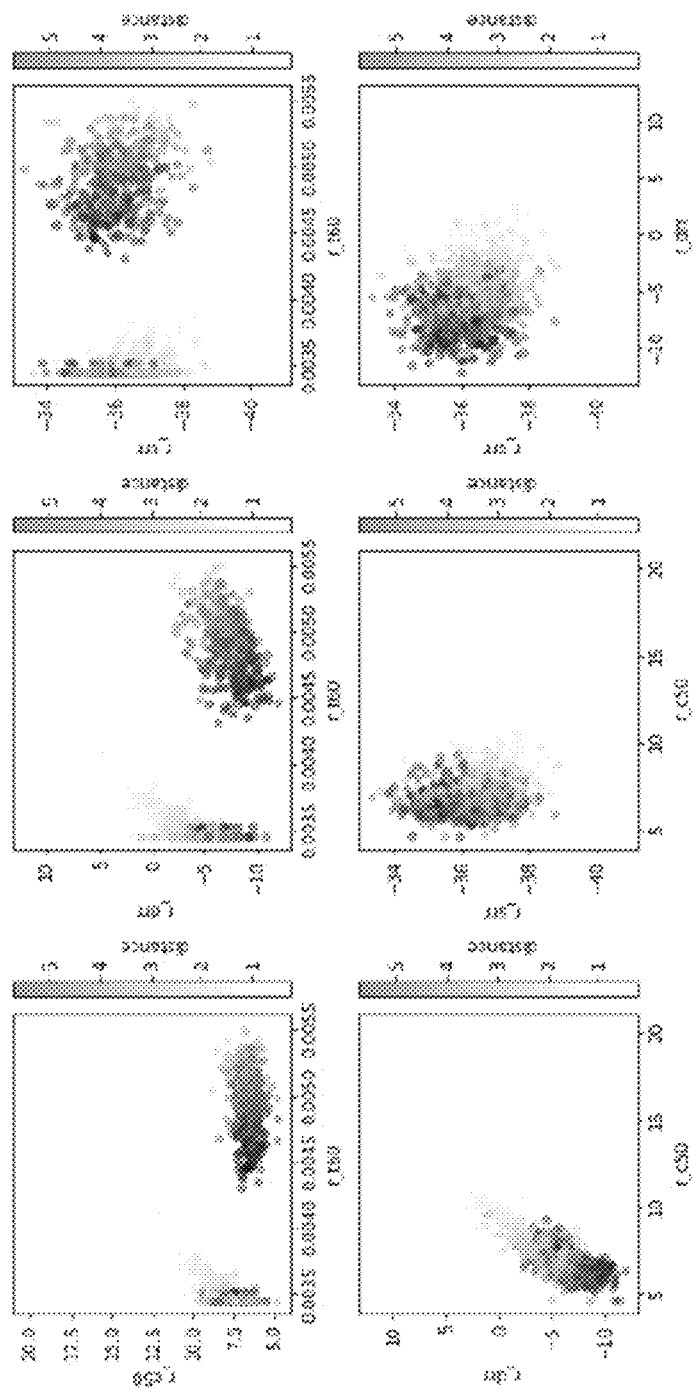
FIG. 1c shows a scatter plot of relative acoustic features in the case of white noise signal.

In this section, experimental results obtained on simulated data for distance estimation are presented, both in the case of white noise and speech signals in a room of specified dimensions and reverberation time. In the case of white noise signal, as shown in FIG. 1c, two clusters of data points are observed, one associated with low distances and the other corresponding to higher speaker-device distances. FIG. 1c shows in the upper row, from left to right, the following plots (x-axis, y-axis): (R-T60, R-C50), (R-T60, R-DRR) and (R-T60, SRR). FIG. 1c shows in the lower row, from left to right, the following plots (x-axis, y-axis): (R-C50, R-DRR), (R-C50, SRR) and (R-DRR, SRR). As can be seen in FIG. 1c, the separation is neater (clearer) in the upper scatter plots corresponding to the 2D domains (R-T60, R-C50), (R-T60, R-DRR) and (R-T60, SRR), which suggests that R-T60 coupled with R-C50, R-DRR and SRR could play an important role in distance estimation. To further investigate this hypothesis, the correlation matrix was computed among all the relative features plus the distance. As shown in FIG. 2, a strong linear correlation between R-C50 and R-DRR with the speaker-wearable distance is exhibited.

Figure 3:
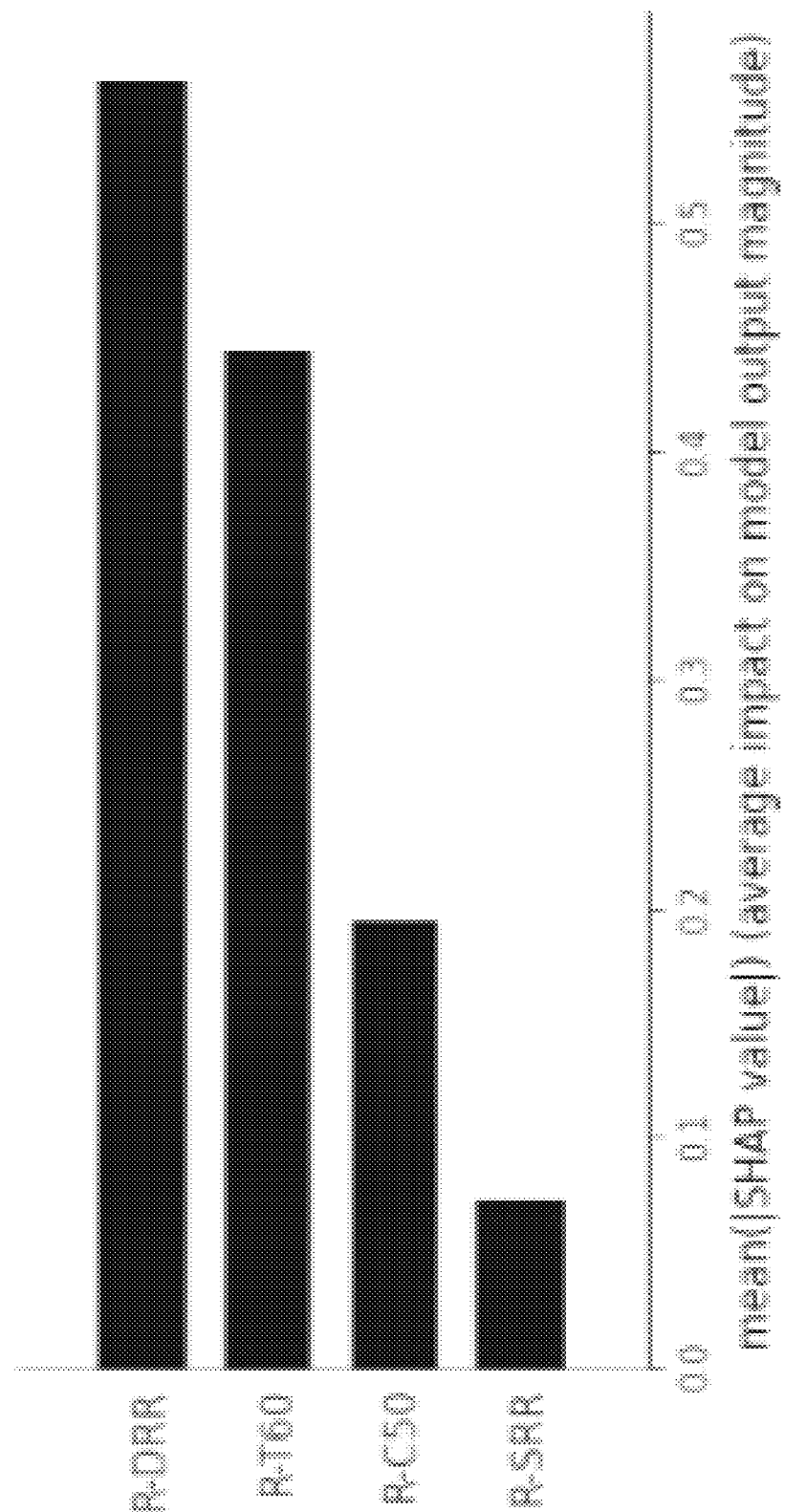
FIG. 3 shows the mean SHAP values corresponding to the average impact of each acoustic feature on the model output magnitude in the case of white noise signal.

The regression model employed in an example embodiment according to the present disclosure to estimate speaker-wearable device distance has been previously discussed. We used 80% of the available data as training set, 10% for validation and the rest for testing. After training, the relative estimation error on the distance defined as $$\frac{\sqrt{(\text{target distance} - \text{predicted distance})^2}}{\text{target distance}} * 100$$

calculated on the test set was 8.85%. Finally, it was shown that each relative feature influences the prediction of XGBoost regression model. By computing the SHAP values for each prediction, the average impact of each feature on the model output magnitude was calculated, as shown in FIG. 3 (x-axis representing mean SHAP value).

Figure 4:
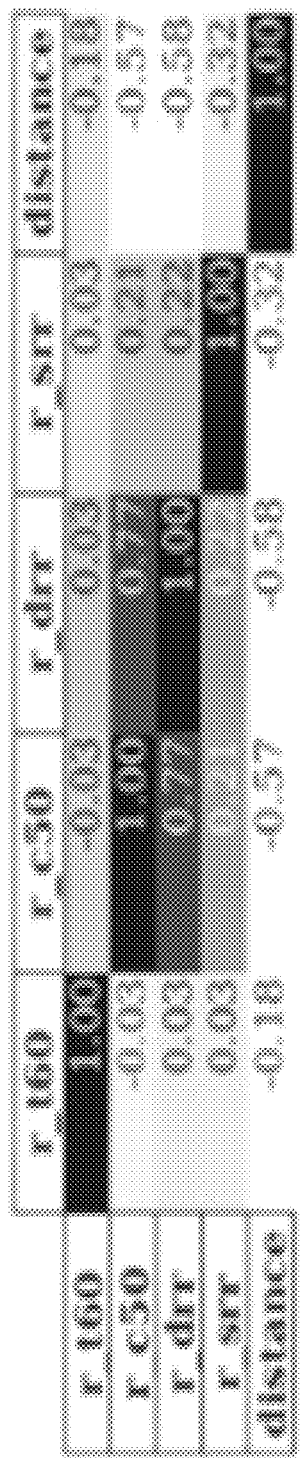
FIG. 4 shows a cross-correlation matrix of all the relative features and the distance in the case of speech signal.
Figure 5:
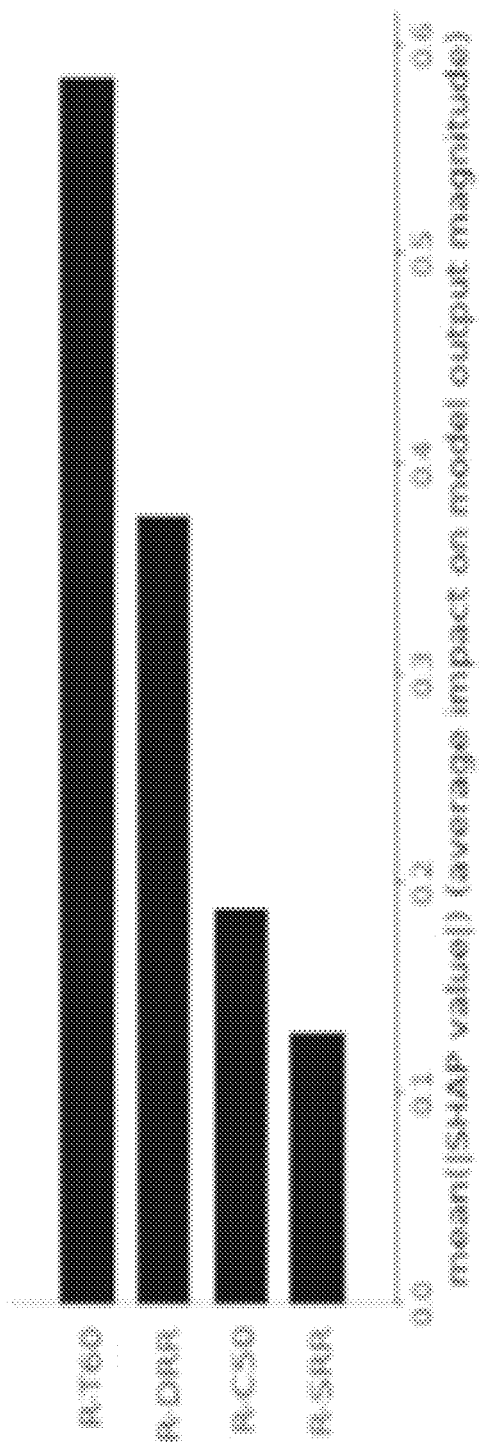
FIG. 5 shows the mean SHAP values corresponding to the average impact of each acoustic feature on the model output magnitude in the case of speech signal.

The above-described experiments carried out with white noise signals were repeated with speech signals selected from the ACE data set, which results are shown in FIG. 4 (cross-correlation matrix for speech signals) and FIG. 5 (x-axis representing mean SHAP value, the average impact of each feature on the model output magnitude). On one hand, a comparison of results shown in FIG. 4 and FIG. 2 indicates a strong linear cross anti-correlation i) between R-DRR and the distance, and ii) between R-C50 and the distance, both in the case of white noise and speech signals. On the other hand, i) R-T60 and SRR both exhibit good correlation with the distance in the case of white noise, but ii) R-T60 and SRR do not exhibit good correlation with the distance in the case of speech signals.

In another example embodiment, after retraining XGBoost on a new set of simulated data in the case of speech signals, i) the relative estimation error on the distance was 11.2%

In another example embodiment, further improvement to the accuracy can be achieved by i) employing a recurrent neural network trained directly on the RTF, and ii) imposing specified constrains on the forecasted distance, e.g., taking into account previous predictions, paving the way for tracking application of the wearable device.

The present disclosure presents a novel ranging system and a method based on acoustic features extracted from the estimated RTF with the IPNLMS adaptive filter. A major advantage of the ranging system and the method of the present disclosure is that there is no need to use the RIR or any model to estimate the acoustic features of the room. By extracting acoustic features directly from the RTF mapping a pair of reverberant signals, the ranging system and the method of the present disclosure enables accurate estimation of the distance between a fixed smart speaker and a wearable device, e.g., indoor.

The ranging system and the example method of the present disclosure can have many useful applications. One example application is detecting the proximity of a speaking user with respect to the fixed smart speaker, which information can be valuable for the ASR. Another example application is detecting obstruction of the direct path between the wearable device and the fixed smart speaker, which information can be useful to properly tune a beamformer for a multichannel device. Another example application is scene analysis, i.e., assessing whether a wearable device is in the same room with respect to the fixed smart speaker. Yet another example application is room virtualization, e.g., coupling the method with ASR to acoustically reconstruct the physical environment. Since key words are usually related to different home locations (e.g., a person uttering "could you give me a knife?" most likely will be in the kitchen). By knowing the distance of the wearable device at different times, we can localize different areas of the house.

The present disclosure provides a first example of a method of performing distance estimation between a first recording device at a first location and a second recording device at a second location, comprising: estimating acoustic relative transfer function (RTF) between the first recording device and the second recording device for a sound signal;

and estimating the distance between the first recording device and the second recording device based on the RTF.

The present disclosure provides a second example method based on the above-discussed first example method, in which second example method: the first recording device is a fixed at the first location, and the second recording device is a movable recording device.

The present disclosure provides a third example method based on the above-discussed second example method, in which third example method: an improved proportionate normalized least mean square (IPNLMS) filter is applied for the estimation of the acoustic RTF; and the distance between the first recording device and the second recording device is estimated based on at least one acoustic feature extracted from the RTF estimated between the first recording device and the second recording device.

The present disclosure provides a fourth example method based on the above-discussed third example method, in which fourth example method: the first recording device is part of a smart home speaker, and the second recording device is part of one of a wearable device or a mobile device.

The present disclosure provides a fifth example method based on the above-discussed third example method, in which fifth example method: the at least one acoustic feature extracted from the RTF estimated between the first recording device and the second recording device includes at least one of clarity index, direct-to-reverberant ratio (DRR), sparseness and reverberation time.

The present disclosure provides a sixth example method based on the above-discussed fifth example method, in which sixth example method: a distributed-gradient-boosting algorithm with regression trees is used in combination with signal-to-reverberation ratio (SRR) and the at least one acoustic feature extracted from the RTF to estimate the distance between the first recording device and the second recording device.

The present disclosure provides a seventh example method based on the above-discussed second example method, in which seventh example method: an improved proportionate normalized least mean square (IPNLMS) filter is applied for the estimation of the acoustic RTF; and the distance between the first recording device and the second recording device is estimated based on a set of acoustic features extracted from the RTF estimated between the first recording device and the second recording device, the set of acoustic features including clarity index, direct-to-reverberant ratio (DRR), and reverberation time.

The present disclosure provides an eighth example method based on the above-discussed seventh example method, in which eighth example method: the first recording device is part of a smart home speaker, and the second recording device is part of one of a wearable device or a mobile device.

The present disclosure provides a ninth example method based on the above-discussed eighth example method, in which ninth example method: a distributed-gradient-boosting algorithm with regression trees is used in combination with signal-to-reverberation ratio (SRR) and the set of acoustic features extracted from the RTF to estimate the distance between the first recording device and the second recording device.

The present disclosure provides a tenth example method based on the above-discussed ninth example method, in which tenth example method: the sound signal is one of i) white shaped noise, and ii) speech signal.

The present disclosure provides a first example system for performing distance estimation between a first recording device at a first location and a second recording device at a second location, comprising: an estimation module for estimation of acoustic relative transfer function (RTF) between the first recording device and the second recording device for a sound signal; and a distance estimation module configured to estimate the distance between the first recording device and the second recording device based on the RTF.

The present disclosure provides a second example system based on the above-discussed first example system, in which second example system: the first recording device is a fixed at the first location, and the second recording device is a movable recording device.

The present disclosure provides a third example system based on the above-discussed second example system, in which third example system: an improved proportionate normalized least mean square (IPNLMS) filter is applied by the estimation module for the estimation of the acoustic RTF; and the distance between the first recording device and the second recording device is estimated based on at least one acoustic feature extracted from the RTF estimated between the first recording device and the second recording device.

The present disclosure provides a fourth example system based on the above-discussed third example system, in which fourth example system: the first recording device is part of a smart home speaker, and the second recording device is part of one of a wearable device or a mobile device.

The present disclosure provides a fifth example system based on the above-discussed third example system, in which fifth example system: the at least one acoustic feature extracted from the RTF estimated between the first recording device and the second recording device includes at least one of clarity index, direct-to-reverberant ratio (DRR), sparseness, and reverberation time.

The present disclosure provides a sixth example system based on the above-discussed fifth example system, in which sixth example system: a distributed-gradient-boosting algorithm with regression trees is used in combination with signal-to-reverberation ratio (SRR) and the at least one acoustic feature extracted from the RTF to estimate the distance between the first recording device and the second recording device.

The present disclosure provides a seventh example system based on the above-discussed second example system, in which seventh example system: an improved proportionate normalized least mean square (IPNLMS) filter is applied by the estimation module for the estimation of the acoustic RTF; and the distance between the first recording device and the second recording device is estimated based on a set of acoustic features extracted from the RTF estimated between the first recording device and the second recording device, the set of acoustic features including clarity index, direct-to-reverberant ratio (DRR), and reverberation time.

The present disclosure provides an eighth example system based on the above-discussed seventh example system, in which eighth example system: the first recording device is part of a smart home speaker, and the second recording device is part of one of a wearable device or a mobile device.

The present disclosure provides a ninth example system based on the above-discussed eighth example system, in which ninth example system: a distributed-gradient-boosting algorithm with regression trees is used in combination with signal-to-reverberation ratio (SRR) and the set of acoustic features extracted from the RTF to estimate the distance between the first recording device and the second recording device.

The present disclosure provides a tenth example system based on the above-discussed ninth example system, in which tenth example system: the sound signal is one of i) white shaped noise, and ii) speech signal.

What is claimed is:

1. A method of performing distance estimation between a first recording device at a first location and a second recording device at a second location, comprising:
   estimating an acoustic relative transfer function (RTF) between the first recording device and the second recording device for a sound signal; and
   estimating a distance between the first recording device and the second recording device based on the acoustic RTF.

2. The method according to claim 1, wherein:
   the first recording device is a fixed recording device at the first location, and the second recording device is a movable recording device.

3. The method according to claim 2, wherein:
   an improved proportionate normalized least mean square (IPNLMS) filter is applied for an estimation of the acoustic RTF; and
   the distance between the first recording device and the second recording device is estimated based on at least one acoustic feature extracted from the acoustic RTF estimated between the first recording device and the second recording device.

4. The method according to claim 3, wherein:
   the first recording device is part of a smart home speaker, and the second recording device is part of one of a wearable device or a mobile device.

5. The method according to claim 3, wherein:
   the at least one acoustic feature extracted from the acoustic RTF estimated between the first recording device and the second recording device includes at least one of clarity index, direct-to-reverberant ratio (DRR), sparseness, and reverberation time.

6. The method according to claim 5, wherein:
   a distributed-gradient-boosting algorithm with regression trees is used in combination with signal-to-reverberation ratio (SRR) and the at least one acoustic feature extracted from the acoustic RTF to estimate the distance between the first recording device and the second recording device.

7. The method according to claim 2, wherein:
   an improved proportionate normalized least mean square (IPNLMS) filter is applied for the estimation of the acoustic RTF, and
   the distance between the first recording device and the second recording device is estimated based on a set of acoustic features extracted from the acoustic RTF estimated between the first recording device and the second recording device, the set of acoustic features including clarity index, direct-to-reverberant ratio (DRR), and reverberation time.

8. The method according to claim 7, wherein:
   the first recording device is part of a smart home speaker, and the second recording device is part of one of a wearable device or a mobile device.

9. The method according to claim 8, wherein:
   a distributed-gradient-boosting algorithm with regression trees is used in combination with signal-to-reverberation ratio (SRR) and the set of acoustic features extracted from the acoustic RTF to estimate the distance between the first recording device and the second recording device.

10. The method according to claim 9, wherein the sound signal is one of i) white shaped noise, and ii) speech signal.

11. A system for performing distance estimation between a first recording device at a first location and a second recording device at a second location, comprising:
    an estimation module for estimation of an acoustic relative transfer function (RTF) between the first recording device and the second recording device for a sound signal; and
    a distance estimation module configured to estimate a distance between the first recording device and the second recording device based on the acoustic RTF.

12. The system according to claim 11, wherein:
    the first recording device is a fixed recording device at the first location, and the second recording device is a movable recording device.

13. The system according to claim 12, wherein:
    an improved proportionate normalized least mean square (IPNLMS) filter is applied by the estimation module for the estimation of the acoustic RTF; and
    the distance between the first recording device and the second recording device is estimated based on at least one acoustic feature extracted from the acoustic RTF estimated between the first recording device and the second recording device.

14. The system according to claim 13, wherein:
    the first recording device is part of a smart home speaker, and the second recording device is part of one of a wearable device or a mobile device.

15. The system according to claim 14, wherein:
    the at least one acoustic feature extracted from the acoustic RTF estimated between the first recording device and the second recording device includes at least one of clarity index, direct-to-reverberant ratio (DRR), sparseness, and reverberation time.

16. The system according to claim 15, wherein:
    a distributed-gradient-boosting algorithm with regression trees is used in combination with signal-to-reverberation ratio (SRR) and the at least one acoustic feature extracted from the acoustic RTF to estimate the distance between the first recording device and the second recording device.

17. The system according to claim 12, wherein:
    an improved proportionate normalized least mean square (IPNLMS) filter is applied by the estimation module for the estimation of the acoustic RTF; and
    the distance between the first recording device and the second recording device is estimated based on a set of acoustic features extracted from the acoustic RTF estimated between the first recording device and the second recording device, the set of acoustic features including clarity index, direct-to-reverberant ratio (DRR), and reverberation time.

18. The system according to claim 17, wherein:
    the first recording device is part of a smart home speaker, and the second recording device is part of one of a wearable device or a mobile device.

19. The system according to claim 18, wherein:
    a distributed-gradient-boosting algorithm with regression trees is used in combination with signal-to-reverberation ratio (SRR) and the set of acoustic features extracted from the acoustic RTF to estimate the distance between the first recording device and the second recording device.

20. The system according to claim 19, wherein the sound signal is one of i) white shaped noise, and ii) speech signal.

\* \* \* \* \*